(No Model.)
L. S. BONBRAK.
Eaves Trough.
No. 230,396.            Patented July 27, 1880.
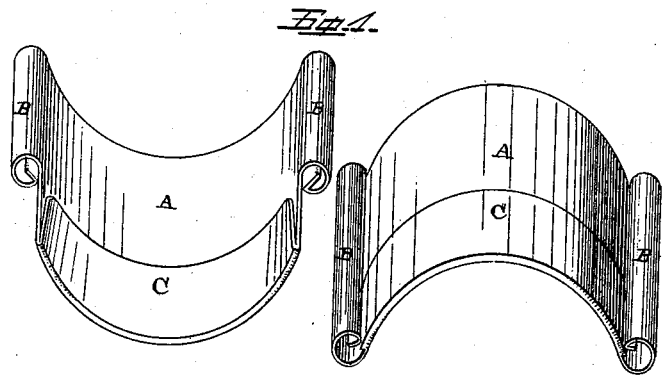
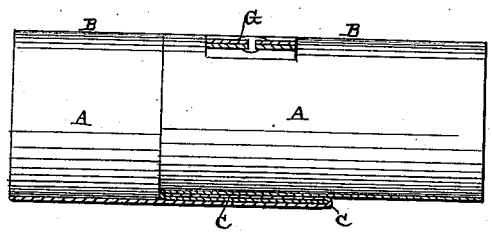
Witnesses=
Chas. H. Isham
W. W. Mortimer
Inventor=
L. S. Bonbrak,
per
F. A. Lehmann,
atty.

UNITED STATES PATENT OFFICE.

LEW. S. BONBRAK, OF WAYNESBURG, OHIO, ASSIGNOR OF ONE-HALF OF HIS RIGHT TO L. SCOTT, OF SAME PLACE.

EAVES-TROUGH.

SPECIFICATION forming part of Letters Patent No. 230,396, dated July 27, 1880.

Application filed June 7, 1880. (No model.)

*To all whom it may concern:*

Be it known that I, LEW. S. BONBRAK, of Waynesburg, in the county of Stark and State of Ohio, have invented certain new and useful Improvements in Eaves-Troughs; and I do hereby declare the following to be a full, clear, and exact description of the invention, such as will enable others skilled in the art to which it pertains to make and use it, reference being had to the accompanying drawings, which form part of this specification.

My invention relates to an improvement in eaves-troughs; and it consists in having the ends of each section project a suitable distance beyond the beaded sides, and then turning these projecting ends backward upon the trough, so as to form a hook, and these hooks, when the two sections of the trough are united together, are made to catch one in the other, whereby the ends of the sections are united together without the expense of soldering or riveting them, as will be more fully described hereinafter.

The object of my invention is to form a slip-joint for the sections of the trough, so as to enable them to be fastened readily together without the help of skilled labor, and which, after being united, can be readily separated.

Figure 1 is a perspective of the two ends of the two sections ready to be united together. Fig. 2 is a longitudinal vertical section of the two sections united together.

A represents the two sections of an eaves-trough, which are provided with the beads B along each of their edges. Each of these sections has one end made to project a suitable distance beyond the ends of these beads, formed on each side, which ends are turned backward upon the section, as shown, so as to form a hook or catch, C. The end of one section is turned backward underneath the section itself, while the other section has its end turned backward inside of the trough. Where the end is to be turned backward inside of the trough the part which projects beyond the ends of the beads is made considerably longer than where the end is to be turned underneath the trough.

When the two sections of the trough are to be united together these hooks are made to catch one in the other, as shown in Fig. 2, when it will be seen that the beads in both sections will be in a direct line with each other, and thus help to brace each other rigidly in position. When the horizontal brace C, which extends across the top of the trough and catches over each side, is made to catch over the beads where they abut together the trough will be held very rigidly and firmly in position.

By forming the joint as here shown the sections of the trough can be readily united together by the most inexperienced workman, and all necessity of soldering and riveting the ends together is entirely done away with.

While this joint allows the sections to expand and contract without any injury to the trough, it holds the sections together with sufficient firmness to prevent them from being accidentally displaced.

Having thus described my invention, I claim—

In an eaves-trough, the combination of the two sections A, having the two beads B, one of which sections has its end project forward beyond the ends of its beads, and turned backward inside of the trough, so as to form the hook C, and the other section having its end turned backward under it to form a hook, whereby, when the ends of the sections are connected together, the beads on both sides form unbroken lines without lapping one within the other, substantially as shown.

In testimony that I claim the foregoing I have hereunto set my hand this 3d day of June, 1880.

LEW. S. BONBRAK.

Witnesses:
WILLIAM RAEDEL,
WILLIAM KLOTZ.